(12) United States Patent
Qi et al.

(10) Patent No.: US 12,542,297 B2
(45) Date of Patent: Feb. 3, 2026

(54) CYLINDRICAL BATTERY

(71) Applicant: CALB Co., Ltd., Jiangsu (CN)

(72) Inventors: Binwei Qi, Luoyang (CN); Qianqian Sun, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 539 days.

(21) Appl. No.: 18/150,773

(22) Filed: Jan. 5, 2023

(65) Prior Publication Data

US 2024/0088424 A1    Mar. 14, 2024

(30) Foreign Application Priority Data

Sep. 8, 2022    (CN) .......................... 202211097635.9

(51) Int. Cl.
*H01M 10/04* (2006.01)
*H01M 50/24* (2021.01)

(52) U.S. Cl.
CPC ....... *H01M 10/0422* (2013.01); *H01M 50/24* (2021.01)

(58) Field of Classification Search
CPC .......................... H01M 10/0422; H01M 50/24
See application file for complete search history.

(56) References Cited

U.S. PATENT DOCUMENTS

2014/0302384 A1    10/2014    Park et al.
2022/0223979 A1    7/2022    Bai et al.

FOREIGN PATENT DOCUMENTS

CN    218448159    2/2023
WO    2022067777    4/2022

OTHER PUBLICATIONS

"Search Report of Europe Counterpart Application", issued on Oct. 24, 2023, p. 1-p. 9.
"Office Action of China Counterpart Application", issued on Nov. 21, 2025, p. 1-p. 6.

*Primary Examiner* — Jane J Rhee
(74) *Attorney, Agent, or Firm* — JCIP GLOBAL INC.

(57) ABSTRACT

A cylindrical battery includes a battery housing; a cell, which is arranged in the battery housing, and includes a cell body and a tab portion, and the tab portion is extended from at least one side of the cell body; a first insulating film, which is arranged on the outer surface of the cell body, and is connected with the cell; a second insulating film, which is arranged on the outer surface of the cell body, the second insulating film covers and is connected with the first insulating film. One end of the second insulating film is not lower than an end surface of the cell body provided with the tab portion, and the other end of the second insulating film overlaps the first insulating film so that a portion of the second insulating film overlaps the first insulating film.

10 Claims, 4 Drawing Sheets

CYLINDRICAL BATTERY

CROSS-REFERENCE TO RELATED APPLICATION

This application claims the priority of China patent application serial no. 202211097635.9, filed on Sep. 8, 2022. The entirety of the above-mentioned patent application is hereby incorporated by reference herein and made a part of this specification.

BACKGROUND

Technical Field

The disclosure relates to the technical field of batteries, in particular to a cylindrical battery.

Description of Related Art

In the related art, the outer surface of the cell of a battery can be insulated and protected by an insulating film. Due to the limitation of the connection mode of the insulating film, the stability of the insulating film is relatively poor, and the insulating film is likely to separate from the outer surface of the cell.

SUMMARY

The present disclosure provides a cylindrical battery, including:
A battery housing;
A cell, which is arranged in the battery housing, and includes a cell body and a tab portion, and the tab portion is extended from at least one side of the cell body;
A first insulating film, which is arranged on the outer surface of the cell body, and is fixedly connected with the cell;
A second insulating film, which is arranged on the outer surface of the cell body, the second insulating film covers at least a portion of the first insulating film, and is fixedly connected with the first insulating film. One end of the second insulating film is not lower than an end surface of the cell body where the tab portion is arranged, and the other end of the second insulating film overlaps the first insulating film so that a portion of the second insulating film overlaps the first insulating film.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
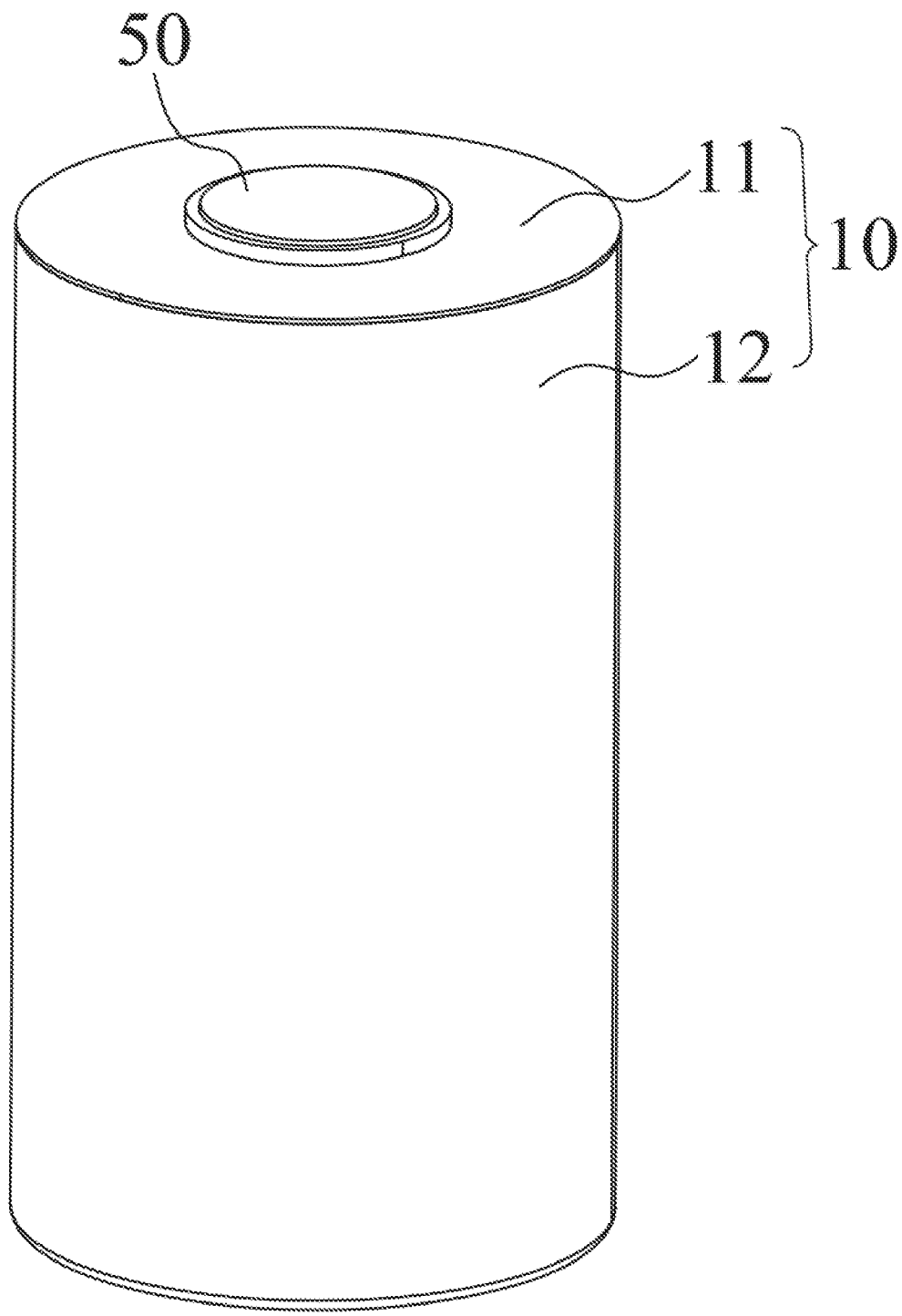
FIG. 1 is a schematic structural diagram of a cylindrical battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the present disclosure provides a cylindrical battery. Please refer to FIG. 1 to FIG. 4. The cylindrical battery includes: a battery housing 10; a cell 20, which is disposed in the battery housing 10, and the cell 20 includes a cell body 21 and a tab portion 22; the tab portion 22 extends from at least one side of the cell body 21; a first insulating film 30, which is arranged on the outer surface of the cell body 21, and is fixedly connected with the cell 20; a second insulating film 40, which is arranged on the outer surface of the cell body 21, the second insulating film 40 covers at least a portion of the first insulating film 30 and is fixedly connected to the first insulating film 30, and one end of the second insulating film 40 is not lower than the end surface of the cell body 21 where the tab portion 22 is provided, and the other end of the second insulating film 40 overlaps the first insulating film 30 so that a portion of the second insulating film 40 overlaps the first insulating film 30.

A cylindrical battery in an embodiment of the present disclosure includes a battery housing 10, a cell 20, a first insulating film 30 and a second insulating film 40. The cell 20 is disposed in the battery housing 10, and at least one side of the cell body 21 extends from a tab portion 22. By arranging the first insulating film 30 and the second insulating film 40 on the outer surface of the cell body 21, it is possible to realize the insulating protection of the cell body 21. By covering part of the second insulating film 40 with the first insulating film 30, and setting one end of the second insulating film 40 not to be lower than the end surface of the cell body 21 where the tab portion 22 is arranged, the other end of the second insulating film 40 is overlapped with the first insulating film 30. On the basis of ensuring that the second insulating film 40 achieves insulation protection, the second insulating film 40 may also be pressed against the first insulating film 30 to improve the insulation performance of the first insulating film 30 on the cell body 21. Meanwhile, the restraint to the cell body 21 is improved, so as to avoid the insulation failure caused by the loosening of the first insulating film 30 and the lack of internal preload that affect the overall energy density of the cylindrical battery, thereby improving the use performance of the cylindrical battery.

It should be noted that the first insulating film 30 may cover the entire outer circumferential surface of the cell body 21 to achieve reliable insulation protection for the cell body 21, and may provide a preload force to the cell body 21. Moreover, the second insulating film 40 is wound on the outer circumferential surface of the cell body 21, that is, the second insulating film 40 is wound on the first insulating film 30, so that it is possible to prevent the second insulating film 40 from falling apart from the cell body 21 on the basis of providing insulating protection and restraint to the cell body 21. In this manner, it may be ensured that the cell body 21 has sufficient insulation performance and avoid the risk of insulation failure between the cell body 21 and the battery housing 10. In some embodiments, it is not excluded that the first insulating film 30 may cover a portion of the outer circumferential surface of the cell body 21.

The first insulating film 30 may be fixedly connected to the cell 20. In this case, the first insulating film 30 may be directly fixedly connected to the cell body 21. For example, the first insulating film 30 may be bonded to the cell body 21, or the first insulating film 30 may be connected to the cell body 21 through the second insulating film 40. For example, there may be no adhesive layer provided between the second insulating film 40 and the cell body 21, and the second insulating film 40 may be bonded to the first insulating film 30, and the second insulating film 40 may be directly bonded to the cell body 21.

The second insulating film 40 is fixedly connected to the first insulating film 30, and the second insulating film 40 and the first insulating film 30 may be directly and fixedly connected. For example, the second insulating film 40 and the first insulating film 30 are adhesively connected, or the first insulating film 30 may be adhesively connected to the cell body 21, and there may be no adhesive layer disposed between the second insulating film 40 and the first insulating film 30, and the second insulating film 40 may be bonded to the cell body 21.

The battery includes a cell and an electrolyte, the minimum unit capable of performing electrochemical reactions such as charging/discharging. The cell refers to a unit formed by winding or laminating a stack portion including a first electrode, a separator and a second electrode. When the first electrode is a positive electrode, the second electrode is a negative electrode, and the polarities of the first electrode and the second electrode are interchangeable. The first electrode and the second electrode are coated with an active material.

The cell may also be a wound cell, that is, the first electrode, the second electrode that is electrically opposite to the first electrode, and the separator disposed between the first electrode and the second electrode are wound to obtain the would cell. The first insulating film 30 covers the wound cell, and the second insulating film 40 covers the first insulating film 30 to protect the first insulating film 30.

In an embodiment, the adhesive connection between the first insulating film 30 and the cell 20 is not only a simple connection, but also the cylindrical battery is less likely to accumulate a large diameter. Moreover, the connection stability of the first insulating film 30 and the cell 20 may be ensured. In this way, it may be ensured that the first insulating film 30 reliably protects the cell 20.

In an embodiment, the second insulating film 40 is adhesively connected to the first insulating film 30, so as to simplify the connection between the second insulating film 40 and the first insulating film 30, and ensure the reliable connection between the second insulating film 40 and the first insulating film 30, so as to ensure that the restraint to the cell body 21 is improved.

In an embodiment, the first insulating film 30 is adhesively connected to the cell 20, and the second insulating film 40 is adhesively connected to the first insulating film 30, so as to ensure that the first insulating film 30 and the second insulating film 40 realize reliable insulation protection for the cell body 21.

In an embodiment, one end of the second insulating film 40 is disposed beyond an end surface of the cell body 21 where the tab portion 22 is provided, so that a portion of the second insulating film 40 is located outside the outer circumferential surface of the tab portion 22, thereby realizing the circumferential protection for the tab portion 22. In this manner, the second insulating film 40 may form insulating protection for the tab portion 22 to some extent.

In an embodiment, one end of the second insulating film 40 is not lower than an end surface of the tab portion 22 away from the cell body 21, that is, the second insulating film 40 may protect the entire outer circumferential surface of the tab portion 22, so as to ensure that the tab portion 22 and the battery housing 10 can be reliably insulated from each other, so as to ensure the safe use performance of the battery.

The length of one end of the second insulating film 40 disposed beyond an end surface of the cell body 21 where the tab portion 22 is provided is not less than the length of the tab portion 22. Therefore, on the basis of effectively protecting the first insulating film 30 by the second insulating film 40, the second insulating film 40 may also protect the tab portion 22, thereby improving the insulating performance between the cell 20 and the battery housing 10.

In an embodiment, one end of the second insulating film 40 is disposed beyond an end surface of the tab portion 22 to be in contact with the battery housing 10, so that the second insulating film 40 may maximize the insulating protection function and improve the internal safety performance of the battery.

In an embodiment, one end of the second insulating film 40 is bonded to the battery housing 10, so as to improve the connection stability of the second insulating film 40 and avoid problems such as falling off of the second insulating film 40, so as to further improve insulation protection of the second insulating film 40 and the first insulating film 30 for the cell 20.

In an embodiment, the overlapping area of the second insulating film 40 and the first insulating film 30 accounts for 10% to 40% of the outer circumferential surface area of the cell body 21. On the basis of ensuring that the second insulating film 40 serves a fixing and protecting function on the first insulating film 30, it is possible to avoid the problem that the overlapping area of the second insulating film 40 and the first insulating film 30 is too large. In this manner, it may be avoided to some extent that the thickness is too large and affects the overall space utilization of the battery.

If the overlapping area of the second insulating film 40 and the first insulating film 30 is too small, the binding force between the second insulating film 40 and the first insulating film 30 will be insufficient, and the risk of the first insulating film 30 falling off and the insulation failure will occur. When the overlapping area of the second insulating film 40 and the first insulating film 30 is too large, the overall thickness inside the battery housing 10 will increase and the overall space utilization rate of the battery will be affected.

The overlapping area of the second insulating film 40 and the first insulating film 30 may account for 10%, 11%, 12%, 15%, 18%, 20%, 21%, 25%, 26%, 28%, 30%, 31%, 32%, 35%, 38%, 39%, or 40%, etc. of the outer circumferential surface area of the cell body 21.

In an embodiment, the overlapping width of the second insulating film 40 and the first insulating film 30 is 5 mm to 30 mm, so that the second insulating film 40 may provide sufficient binding force for the first insulating film 30 to prevent the first insulating film 30 from loosening and falling apart. Also, it is possible to avoid the problem that the area of the second insulating film 40 is too large and avoid the increase of large space inside the battery housing 10. The overlapping width of the second insulating film 40 and the first insulating film 30 may be regarded as the size of the overlapping part of the second insulating film 40 and the first insulating film 30 along the direction in which the tab portion 22 extends from the cell body 21.

The overlapping width of the second insulating film 40 and the first insulating film 30 may be 5 mm, 6 mm, 8 mm, 10 mm, 15 mm, 18 mm, 19 mm, 20 mm, 22 mm, 25 mm, 26 mm, 28 mm, 29 mm or 30 mm, and so on.

In an embodiment, the thickness of the first insulating film 30 is 0.02 mm to 0.05 mm. On the basis of ensuring that the first insulating film 30 can achieve reliable insulating performance, it is also possible to prevent the first insulating film 30 from being too thick and occupying too much space, thus reducing the weight of the first insulating film 30.

The thickness of the first insulating film 30 may be 0.02 mm, 0.025 mm, 0.03 mm, 0.035 mm, 0.04 mm, 0.045 mm, 0.046 mm, 0.048 mm, 0.049 mm, or 0.05 mm, or the like.

In an embodiment, the thickness of the second insulating film 40 may be 0.02 mm to 0.05 mm. On the basis of ensuring that the second insulating film 40 can reliably protect the first insulating film 30 and can achieve reliable insulating performance, it is also possible to prevent the second insulating film 40 from being too thick and occupying too much space, thus reducing the weight of the second insulating film 40.

The thickness of the second insulating film 40 may be 0.02 mm, 0.025 mm, 0.03 mm, 0.035 mm, 0.04 mm, 0.045 mm, 0.046 mm, 0.048 mm, 0.049 mm, or 0.05 mm, or the like.

In an embodiment, the thickness of the first insulating film 30 may be greater than the thickness of the second insulating film 40, so as to improve the insulating performance of the first insulating film 30 to the cell body 21 and improve the restraint to the cell body 21, while the second insulating film 40 will not cause too much increase in the diameter of the cylindrical battery, so as to ensure that the cylindrical battery has a high volumetric energy density.

In some embodiments, it is not excluded that the thickness of the first insulating film 30 may be equal to the thickness of the second insulating film 40.

In an embodiment, the adhesive strength of the first insulating film 30 is greater than the adhesive strength of the second insulating film 40, so that the first insulating film 30 may be reliably bonded to the cell body 21, and the second insulating film 40 may also be easily bonded to the first insulating film 30, so as to ensure that the second insulating film 40 is able to protect the first insulating film 30.

The first insulating film 30 may effectively cover the cell body 21, thereby providing sufficient restraint force to the cell body 21, and may prevent the first insulating film 30 from detaching from the cell body 21. The second insulating film 40 is mainly provided for protecting the first insulating film 30. Therefore, the adhesive strength of the second insulating film 40 may be relatively small, so as to facilitate the second insulating film 40 to be bonded to the cell body 21.

The adhesive strength of the first insulating film 30 is greater than that of the second insulating film 40, that is, the peeling force of the first insulating film 30 is greater than the peeling force of the second insulating film 40. The second insulating film 40 may be removed from the first insulating film 30, so as to facilitate the replacement of the second insulating film 40.

In some embodiments, it is not excluded that the adhesive strength of the first insulating film 30 is equal to the adhesive strength of the second insulating film 40.

In an embodiment, the second insulating film 40 is formed with an overlapping region, so that the second insulating film 40 can form a circumferentially closed space, thereby improving the protection that the second insulating film 40 provides for the first insulating film 30, so as to avoid the risk of falling off of the first insulating film 30 and the like.

The second insulating film 40 is formed with an overlapping region, that is, the second insulating film 40 may have a first end and a second end, and the first end may be covered by the second insulating film 40, so that the second insulating film 40 is formed with an overlapping region. In this manner, not only can high-efficiency protection for the first insulating film 30 be achieved, but also the insulating protection capability of the second insulating film 40 may be improved.

In an embodiment, the width of the overlapping region is 0.2 mm to 5 mm. On the basis of ensuring that the second insulating film 40 can have reliable connection strength and restraint force, it is also possible to prevent the thickness of the second insulating film 40 from increasing too much. Accordingly, the overall weight of the battery is reduced.

The width of the overlapping region may be 0.2 mm, 0.3 mm, 0.5 mm, 1 mm, 1.2 mm, 1.3 mm, 1.5 mm, 2 mm, 2.5 mm, 3 mm, 3.5 mm, 4 mm, 4.2 mm, 4.3 mm, 4.5 mm, 4.8 mm, 4.9 mm or 5 mm and so on.

In an embodiment, the first insulating film 30 is a first adhesive tape, and the second insulating film 40 is a second adhesive tape, so that the first insulating film 30 may be reliably bonded to the cell body 21 and the second insulating film 40 can be reliably bonded to the first insulating film 30, thereby improving the insulating protection capability of the first insulating film 30 and the second insulating film 40, thereby ensuring the safe use performance of the battery.

The adhesive layer of the first insulating film 30 is bonded to the cell body 21, and the adhesive layer of the second insulating film 40 is bonded to the first insulating film 30.

In an embodiment, the tab portion 22 includes a positive tab and a negative tab, and the positive tab and the negative tab extend from the same side of the cell body 21. The positive tab and the negative tab are extended from the same side of the cell body 21, so as to improve the overall space utilization rate inside the battery. Moreover, it is possible for the positive tab and the negative tab to be respectively connected to the positive pole rod and the negative pole rod located on the same side of the battery housing 10. Or, the positive tab and the negative tab are respectively connected to the battery housing 10 and the pole rod, and the battery housing 10 serves as an electrode terminal of the battery, which can facilitate the subsequent connection of batteries in groups. Furthermore, the battery housing 10 has a relatively large area, which may ensure a reliable overcurrent area when the batteries are grouped, so as to ensure the overall charging and discharging rate of the battery.

In some embodiments, it is not excluded that the positive tab and the negative tab may extend from opposite sides of the cell body 21.

It should be noted that there may be multiple positive tabs and negative tabs, and the positive tabs and the negative tabs may be alternately arranged to ensure the insulation performance between the positive tabs and the negative tabs. Alternatively, the number of the positive tab and the negative tab may be one.

Figure 2:
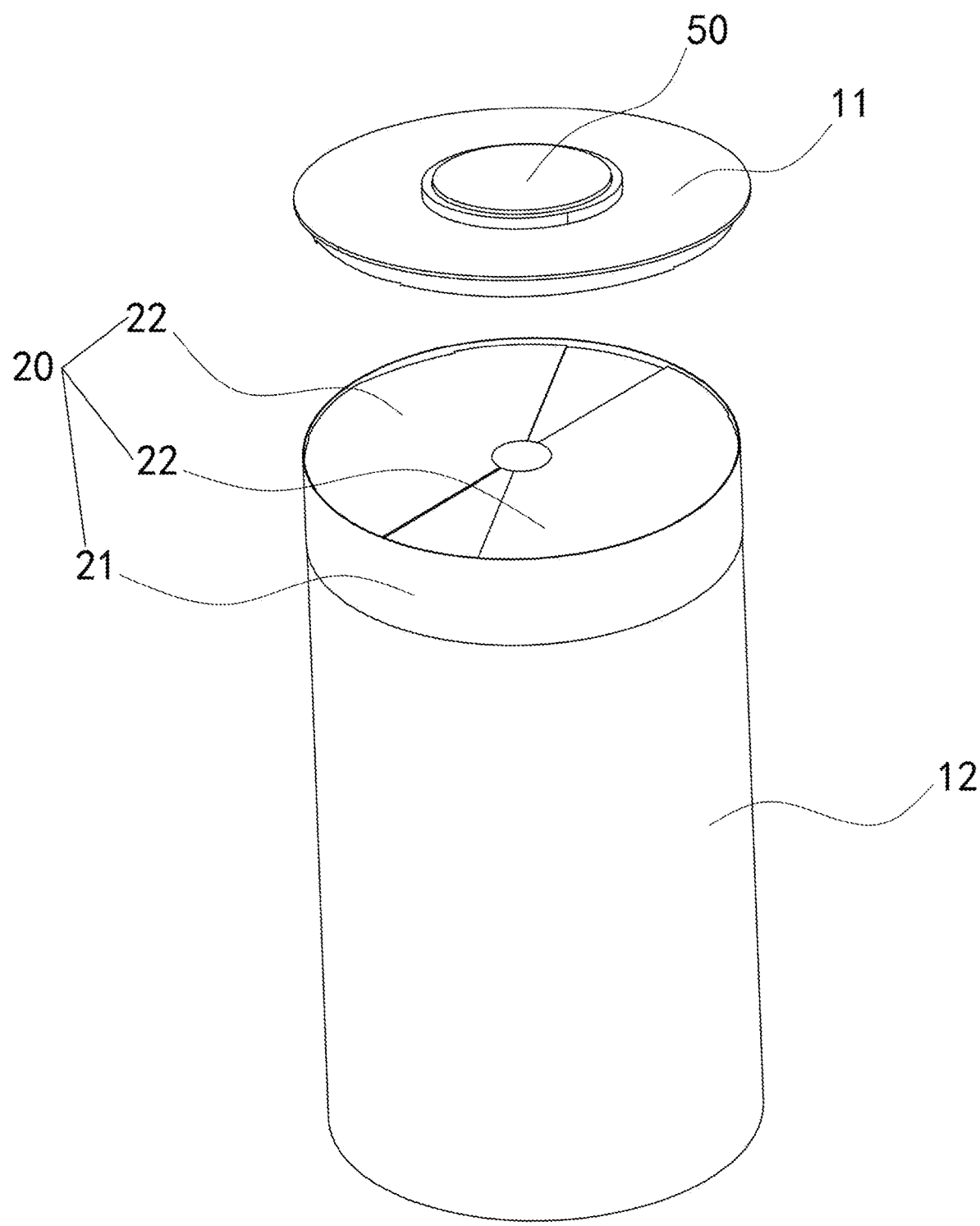
FIG. 2 is a schematic diagram of an exploded structure of a cylindrical battery according to an exemplary embodiment.
Figure 3:
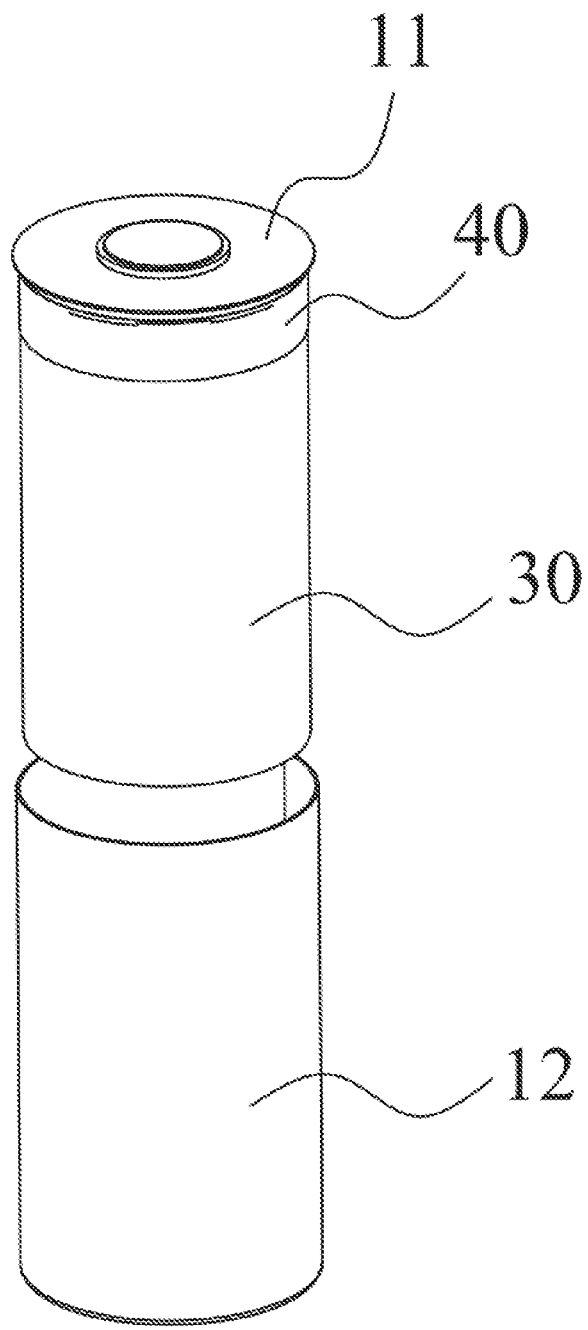
FIG. 3 is another schematic diagram of an exploded structure of a cylindrical battery according to an exemplary embodiment.
Figure 4:
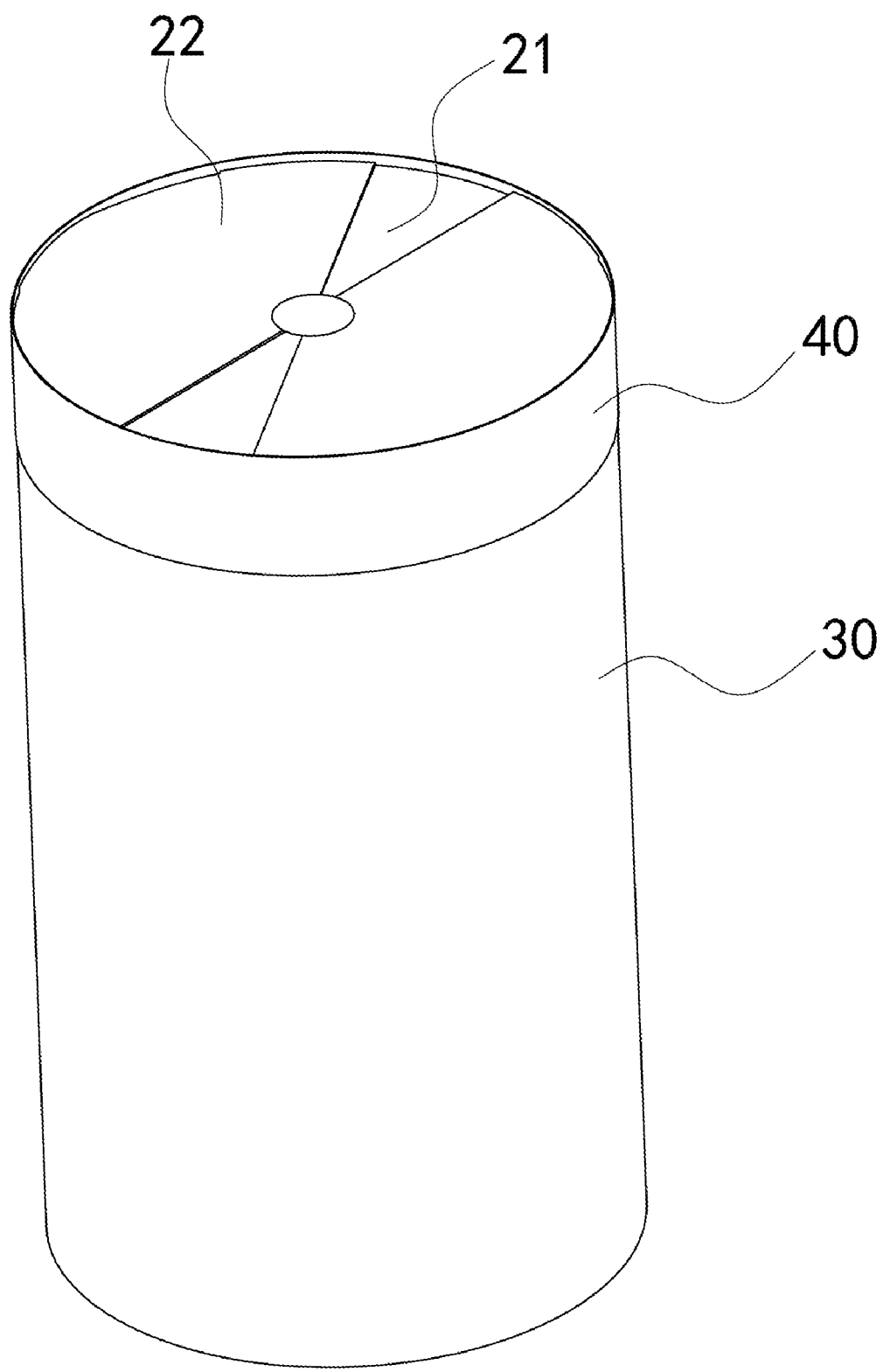
FIG. 4 is a schematic diagram of a partial structure of a cylindrical battery according to an exemplary embodiment.

In an embodiment, as shown in FIG. 1 to FIG. 3, the battery housing 10 includes: a first housing member 11 and a second housing member 12. The second housing member 12 is connected with the first housing member 11 to achieve effective protection for the cell 20.

In an embodiment, the first housing member 11 is a cover plate, the tab portion 22 extends toward the cover plate, the second housing member 12 may be formed with an accommodating space, and the second insulating film 40 may be connected to the first housing member 11. The setting of the cover plate may also facilitate the assembly of the battery. In some embodiments, both the first housing member 11 and the second housing member 12 may be formed with accommodating spaces.

A pole assembly 50 may be disposed on the first housing member 11, and the pole assembly 50 and the battery housing 10 may be electrically connected to two tab portions 22 with different polarities, respectively. The pole assembly 50 and the battery housing 10 may be directly connected to two tab portions 22 of different polarities, respectively, or, the pole assembly 50 and the battery housing 10 may be respectively connected to two tab portions 22 of different polarities through two current collectors.

The first housing member 11 includes steel and the second housing member 12 includes steel. Alternatively, the first housing member 11 includes aluminium and the second housing member 12 includes aluminium. The first housing member 11 may include a composite metal material, e.g., the first housing member 11 may include a copper-aluminum composite material, and the second housing member 12 may include a composite metal material, e.g., the second housing member 12 may include copper-aluminum composite material.

The first housing member 11 and the second housing member 12 may be welded together, or the first housing member 11 and the second housing member 12 may be riveted together.

An embodiment of the present disclosure also provides a battery set including the above cylindrical battery.

A battery set in an embodiment of the present disclosure includes a cylindrical battery. The cylindrical battery includes a battery housing 10, a cell 20, a first insulating film 30 and a second insulating film 40. The cell 20 is disposed in the battery housing 10, and a tab portion 22 extends from at least one side of the cell body 21. By arranging the first insulating film 30 and the second insulating film 40 on the outer surface of the cell body 21, it is possible to realize the insulating protection of the cell body 21. By covering part of the second insulating film 40 with the first insulating film 30, and setting one end of the second insulating film 40 not to be lower than the end surface of the cell body 21 where the tab portion 22 is arranged, the other end of the second insulating film 40 is overlapped with the first insulating film 30. On the basis of ensuring that the second insulating film 40 achieves insulation protection, the second insulating film 40 may also be pressed against the first insulating film 30 to improve the insulation performance of the first insulating film 30 on the cell body 21. Meanwhile, the restraint to the cell body 21 is improved, so as to avoid the insulation failure caused by the loosening of the first insulating film 30 and the lack of internal preload that affect the overall energy density of the cylindrical battery, thereby improving the use performance of the battery set.

In an embodiment, the battery set is a battery module or a battery pack.

The battery module includes a plurality of cylindrical batteries, the battery module may further include a bracket, and the cylindrical battery may be fixed on the bracket.

The battery pack includes a plurality of cylindrical batteries and a box body, and the box body is provided for fixing the plurality of cylindrical batteries.

It should be noted that the battery pack includes cylindrical batteries, and the number of cylindrical batteries may be multiple, and the multiple cylindrical batteries are arranged in the box body. The multiple cylindrical batteries may be formed into a battery module and then arranged in the box body. Alternatively, the multiple cylindrical batteries may be directly arranged in the box body, that is, the box body is used to fix the multiple batteries with no need to arrange the multiple batteries into groups.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A cylindrical battery, comprising:
   a battery housing;
   a cell, which is arranged in the battery housing, and comprises a cell body and a tab portion, wherein the tab portion is extended from at least one side of the cell body;

a first insulating film, which is arranged on an outer surface of the cell body, and is fixedly connected with the cell;

a second insulating film, which is arranged on the outer surface of the cell body, and covers at least a portion of the first insulating film, and is fixedly connected with the first insulating film, wherein one end of the second insulating film is not lower than an end surface of the cell body where the tab portion is arranged, and the other end of the second insulating film overlaps the first insulating film so that a portion of the second insulating film overlaps the first insulating film, wherein the first insulating film is adhesively connected to the cell, and/or the second insulating film is adhesively connected to the first insulating film, wherein an overlapping area of the second insulating film and the first insulating film accounts for 10% to 40% of an outer circumferential surface area of the cell body, wherein an overlapping width of the second insulating film and the first insulating film is 5 mm to 30 mm, wherein a thickness of the first insulating film is 0.02 mm to 0.05 mm, and wherein the first insulating film is a first adhesive tape, and the second insulating film is a second adhesive tape.

2. The cylindrical battery according to claim 1, wherein one end of the second insulating film is disposed beyond the end surface of the cell body where the tab portion is disposed.

3. The cylindrical battery according to claim 2, wherein one end of the second insulating film is not lower than an end surface of the tab portion away from the cell body.

4. The cylindrical battery according to claim 3, wherein one end of the second insulating film is disposed beyond an end surface of the tab portion to be in contact with the battery housing.

5. The cylindrical battery according to claim 4, wherein one end of the second insulating film is bonded to the battery housing.

6. The cylindrical battery according to claim 1, wherein a thickness of the first insulating film is greater than a thickness of the second insulating film.

7. The cylindrical battery according to claim 1, wherein an adhesive strength of the first insulating film is greater than an adhesive strength of the second insulating film.

8. The cylindrical battery according to claim 1, wherein the second insulating film is formed with an overlapping region;

a width of the overlapping region is 0.2 mm to 5 mm.

9. The cylindrical battery according to claim 1, wherein the tab portion comprises a positive tab and a negative tab, and the positive tab and the negative tab extend from the same side of the cell body.

10. The cylindrical battery according to claim 1, wherein the battery housing comprises:

a first housing member;

a second housing member, which is connected with the first housing member;

wherein the first housing member is a cover plate, and the tab portion extends toward the cover plate.

* * * * *